(No Model.)
C. F. HITCHCOCK & F. H. EDWARDS.
LAWN SPRINKLER.
No. 579,873. Patented Mar. 30, 1897.
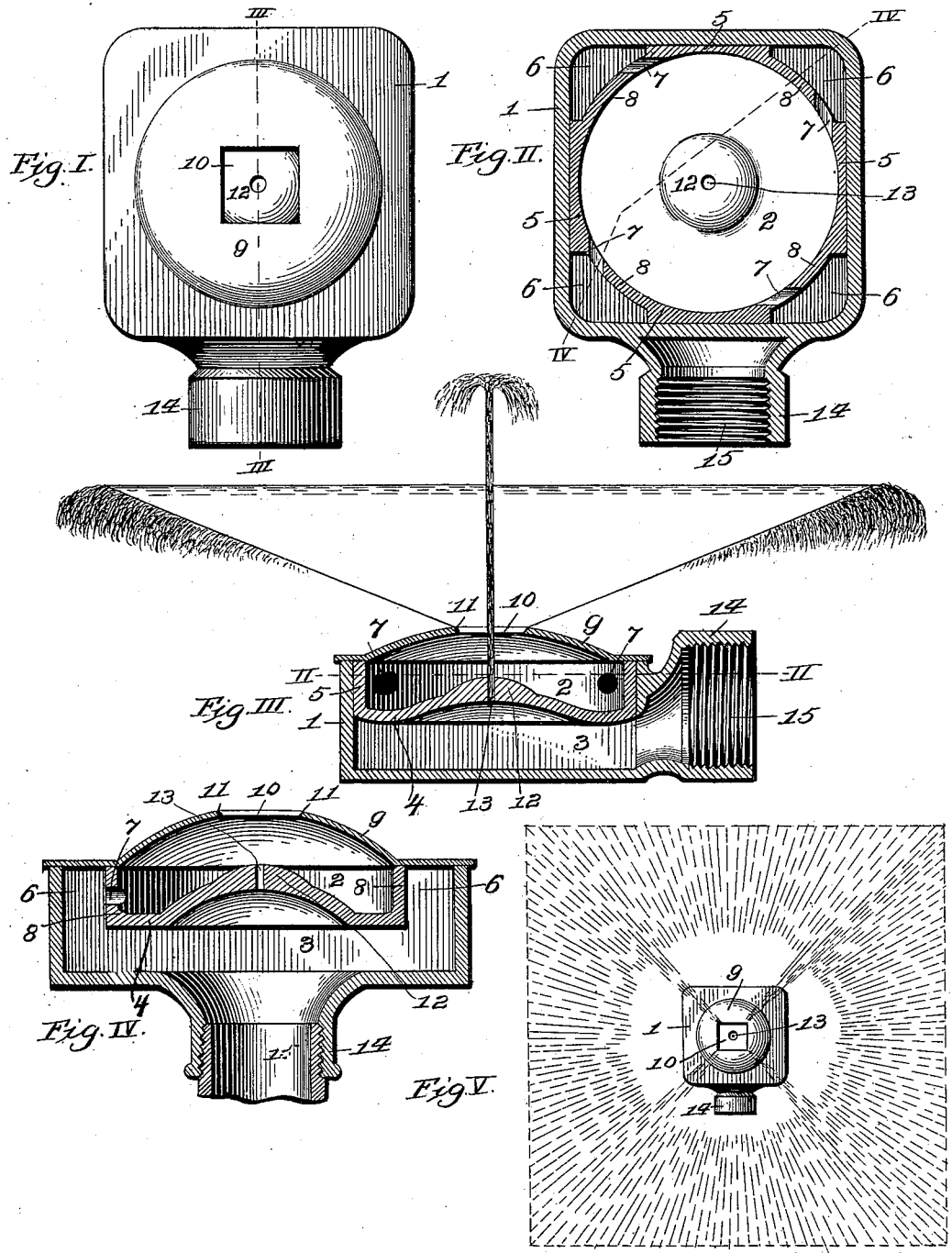
Witnesses:
Herbert Bradley
F. R. Proctor
Inventors.
Charles F. Hitchcock.
Frank H. Edwards.
By Knight Bros.
Attys.

UNITED STATES PATENT OFFICE.

CHARLES F. HITCHCOCK AND FRANK H. EDWARDS, OF LOS ANGELES, CALIFORNIA, ASSIGNORS, BY MESNE ASSIGNMENTS, TO THE HITCHCOCK METAL COMPANY, OF SAN FRANCISCO, CALIFORNIA.

LAWN-SPRINKLER.

SPECIFICATION forming part of Letters Patent No. 579,873, dated March 30, 1897.

Application filed September 20, 1895. Serial No. 563,141. (No model.)

*To all whom it may concern:*

Be it known that we, CHARLES F. HITCHCOCK and FRANK H. EDWARDS, of Los Angeles, in the county of Los Angeles and State of California, have invented certain new and useful Improvements in Lawn-Sprinklers, of which the following is a full, clear, and exact description, reference being had to the accompanying drawings, which form a part of this specification.

Our invention relates to improvements in lawn-sprinklers, and more especially to that feature which causes a square spray to be discharged, as distinguished from the ordinary circular spray, and which conforms to the contour of the ordinary lawn; and our invention consists in certain features of novelty hereinafter described and claimed.

Figure I is a top view showing square discharge-opening. Fig. II is a transverse section taken on line II II, Fig. III. Fig. III is a vertical section taken on line III III, Fig. I. Fig. IV is in the main a diagonal section taken on line IV IV, Fig. II, but showing the coupling as adapted for a stand-pipe or fountain. Fig. V is a top view showing the manner in which a spray is thrown.

Referring to the drawings, 1 represents the body of the sprinkler, which is square in general outline; 2, a discharge-chamber circular in transverse section, and 3 a square supply-chamber. The division-wall 4 between these chambers, which forms the bottom and sides of chamber 2 and top of chamber 3, extends to the inner vertical wall of the body, as shown at 5, leaving vertical openings 6 in the four corners of the body, which extends up to the top of the body and connect with the supply-chamber at their bottoms.

7 represents a series of orifices extending through vertical portions 8 of the division-wall 4, through which water is permitted to pass from the supply-chamber to the discharge-chamber.

9 represents the top of the sprinkler over the discharge-chamber, said top being preferably dome-shaped and having a central square discharge-opening 10 with a sharp edge 11.

The central portion of the division-wall 4 is arched, as shown at 12, and has a central discharge-orifice 13, located immediately beneath the square discharge-opening 10.

14 represents the coupling, which may be located on the side, as shown in Fig. III, as adapted for a hose, or it may be placed on the bottom of the body, as shown in Fig. IV, this latter form being the best for a stand-pipe or fountain.

The water enters the body through the supply-opening 15, passes into the supply-chamber up into the vertical openings 6, and out through the orifices 7 into the circular discharge-chamber.

The orifices 7 are so formed that as the water is discharged through the same it impinges against the circular wall of the chamber, a continuous circular movement being thus imparted to the water, which as it is thrown out of the square discharge-opening 10 is formed into a square spray, thus overcoming the many objections to a circular spray. When sprinkling a lawn having square edges, a fountain effect is given to the sprinkler by a small portion of the water passing through the central orifice 13, (see Fig. III,) the under side of the arched portion 12 of the division-wall giving direction to the water which passes through the orifice 13 and the upper side of the arch aiding in giving direction to the water thrown out of the discharge-chamber.

We claim as our invention—

1. In a lawn-sprinkler, the combination of a square supply-chamber, a discharge-chamber located in said supply-chamber and formed of a circular wall, an arched bottom and a dome top formed with a square outlet, suitable openings located in the circular wall forming a communication between the corners of the supply-chamber and circular discharge-chamber, and a suitable opening formed in the apex of the arch of the bottom of the discharge-chamber, substantially as shown and described.

2. In a lawn-sprinkler the combination of a square supply-chamber, a circular discharge-chamber a discharge-opening, openings in the corners of the supply-chamber extending to the top of the sprinkler and orifices connecting said openings with the discharge-chamber, whereby the water is discharged against the sides of the circular chamber and is given a continuous circular movement, substantially as set forth.

CHARLES F. HITCHCOCK.
FRANK H. EDWARDS.

Witnesses;
 JAS. E. KNIGHT,
 E. W. LITTLE.